(12) United States Patent
Deacon et al.

(10) Patent No.: US 12,275,587 B2
(45) Date of Patent: Apr. 15, 2025

(54) CONTROL DEVICE AND METHOD FOR ITEM VERIFICATION

(71) Applicant: Ocado Innovation Limited, Hatfield (GB)

(72) Inventors: Graham Deacon, Hatfield (GB); Osemwaro Jeremiah Pedro, Hatfield (GB); Christos Makris, Harfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 18/396,837

(22) Filed: Dec. 27, 2023

(65) Prior Publication Data

US 2024/0124233 A1 Apr. 18, 2024

Related U.S. Application Data

(63) Continuation of application No. 15/734,121, filed as application No. PCT/EP2019/064087 on May 29, 2019, now Pat. No. 11,891,247.

(30) Foreign Application Priority Data

Jun. 1, 2018 (GB) .................................... 1809020

(51) Int. Cl.
*B65G 1/137* (2006.01)
*B25J 9/16* (2006.01)
(Continued)

(52) U.S. Cl.
CPC .......... *B65G 1/1371* (2013.01); *B25J 9/1612* (2013.01); *B25J 9/163* (2013.01); *B25J 9/1679* (2013.01);
(Continued)

(58) Field of Classification Search
CPC .. B65G 1/1371; B65G 1/0464; B65G 1/1378; B65G 47/32; B65G 47/48; B65G 47/90;
(Continued)

(56) References Cited

U.S. PATENT DOCUMENTS 9,687,983 B1 * 6/2017 Prats ...................... B25J 9/1612
11,891,247 B2 * 2/2024 Deacon .................... B25J 19/02
(Continued)

FOREIGN PATENT DOCUMENTS

CN 105228712 A 1/2016
CN 106414278 A 2/2017
(Continued)

OTHER PUBLICATIONS

First Office Action issued on Jan. 18, 2022, by the Japanese Patent Office in corresponding Japanese Patent Application No. 2020-565443, and an English Translation of the Office Action. (11 pages).
(Continued)

*Primary Examiner* — Thomas Randazzo
(74) *Attorney, Agent, or Firm* — Buchanan Ingersoll & Rooney PC

(57) ABSTRACT

A control device is provided to more quickly and efficiently verify which item has been grasped by a robot system whilst also providing a solution which is scalable. Verification of the item which has been grasped is achieved by measuring a dynamics property of the item. A control unit for operation with a robot system a sensor unit, the robot system arranged to grasp an item from a container. The control unit includes a verification unit arranged to receive identifying information of an item expected to be in the container, receive information from the sensor unit indicative of a dynamics property of the item grasped by the robot system and verify that the item grasped by the robot system matches the item expected to be in the container based on the received
(Continued)

identifying information and the received dynamics property information.

20 Claims, 13 Drawing Sheets

(51) Int. Cl.
  *B25J 13/08* (2006.01)
  *B25J 19/02* (2006.01)
  *B65G 1/04* (2006.01)
  *G06K 7/14* (2006.01)
  *G06N 20/00* (2019.01)

(52) U.S. Cl.
  CPC .............. *B25J 13/08* (2013.01); *B25J 19/02* (2013.01); *B65G 1/0464* (2013.01); *B65G 1/1378* (2013.01); *G06K 7/1413* (2013.01); *G06N 20/00* (2019.01); *B65G 2203/042* (2013.01)

(58) Field of Classification Search
  CPC ...... B65G 47/905; B65G 47/91; B65G 61/00; B65G 2201/00; B65G 2201/02; B65G 2201/025; B65G 2201/0258; B65G 2203/04; B65G 2203/042; B65G 2811/00; B65G 2811/06; B65G 2811/0673; B65G 47/917; B25J 9/1612; B25J 9/163; B25J 9/1679; B25J 9/1687; B25J 9/161; B25J 9/1697; B25J 13/08; B25J 19/02; G06K 7/1413; G06N 20/00; G05B 2219/39107; G05B 2219/40053; G05B 2219/40499; G05B 2219/45063
  See application file for complete search history.

(56) References Cited

U.S. PATENT DOCUMENTS

| | | | |
|---|---|---|---|
| 2011/0166696 A1 | 7/2011 | Nignon | |
| 2011/0223001 A1* | 9/2011 | Martinez | B25J 9/1697 414/730 |
| 2013/0245824 A1* | 9/2013 | Barajas | B25J 9/1664 901/46 |
| 2014/0128997 A1* | 5/2014 | Holub | G05B 13/048 700/30 |
| 2015/0032252 A1* | 1/2015 | Galluzzo | B25J 9/162 700/218 |
| 2015/0332213 A1* | 11/2015 | Galluzzo | B25J 15/0085 700/218 |
| 2016/0194151 A1* | 7/2016 | Lindbo | G06Q 10/08 |
| 2017/0225330 A1* | 8/2017 | Wagner | B07C 3/008 |
| 2017/0334646 A1* | 11/2017 | High | B65G 1/1376 |
| 2018/0043547 A1* | 2/2018 | Hance | B25J 19/021 |
| 2018/0050451 A1 | 2/2018 | Takanishi et al. | |
| 2019/0359424 A1* | 11/2019 | Avraham | G06Q 10/08 |
| 2021/0214163 A1 | 7/2021 | Deacon et al. | |

FOREIGN PATENT DOCUMENTS

| | | | | |
|---|---|---|---|---|
| CN | 107756422 A | 3/2018 | | |
| EP | 3284563 A2 | 2/2018 | | |
| JP | 2016529181 A | 9/2016 | | |
| JP | 2016175137 A | 10/2016 | | |
| JP | 2018027581 A | 2/2018 | | |
| NO | 317366 B1 * | 10/2004 | .......... | B65G 1/0464 |
| WO | WO-9849075 A1 * | 11/1998 | .......... | B65G 1/0464 |
| WO | 2014194191 A1 | 12/2014 | | |
| WO | 2015019055 A1 | 2/2015 | | |
| WO | WO-2015185628 A2 * | 12/2015 | ............. | B60L 58/12 |
| WO | 2018022264 A1 | 2/2018 | | |

OTHER PUBLICATIONS

First Office Action issued on Nov. 28, 2023, by the Japanese Patent Office in corresponding Japanese Patent Application No. 2022-171462, and an English Translation of the Office Action. (4 pages).
International Search Report (PCT/ISA/210) mailed on Sep. 10, 2019, by the European Patent Office as the International Searching Authority for International Application No. PCT/EP2019/064087.
Office Action (Examination Report No. 1) issued on Aug. 8, 2023, by the Australian Patent Office in corresponding Australian Patent Application No. 2022203603. (3 pages).
Office Action (Notice of Allowance) issued on Apr. 18, 2023, by the Korean Patent Office in corresponding Korean Patent Application No. 10-2023-7002329, and an English Translation of the Office Action. (3 pages).
Office Action (Notification of Reason for Refusal) issued on Feb. 3, 2022, by the Korean Patent Office in corresponding Korean Patent Application No. 10-2020-7033505, and an English Translation of the Office Action. (14 pages).
Office Action issued on Nov. 12, 2021, by the Canadian Patent Office in corresponding Canadian Patent Application No. 3,095,706. (3 pages).
Written Opinion (PCT/ISA/237) mailed on Sep. 10, 2019, by the European Patent Office as the International Searching Authority for International Application No. PCT/EP2019/064087.
2019276201, "Office Action (Examination Report No. 1) Received" , 3 pages.
Office Action issued on May 10, 2024, by the Chinese Patent Office in corresponding Chinese Patent Application No. 201980036228.7, and an English Translation of the Office Action. (26 pages).

* cited by examiner

CONTROL DEVICE AND METHOD FOR ITEM VERIFICATION

This application is a continuation of U.S. application Ser. No. 15/734,121 filed Dec. 1, 2020, which claims priority from UK Patent Application No. 1809020.9 filed 1 Jun. 2018, the content of all this application hereby being incorporated by reference.

TECHNICAL FIELD

The present invention relates generally to the field of robot systems and more specifically to a control device and method for controlling a robot system.

BACKGROUND

In the field of picking systems a robot system is typically used to selectively grasp items in a first container and transport them to a second container. For example, FIG. 1 shows a robot system 200 comprising an end effector 201, for example a suction cup end effector. The robot system is arranged to transfer an item, such as a cuboid item 301, a first cylindrical item 302 and/or a second cylindrical item 303 from a first container 300 to a second container 400. Typically, information about the contents of the first container 300 are known to the picking system from other automated processes. However, picking systems are required to verify which item has been picked before it is placed in the second container 400 to ensure that no incorrect items are transferred into the second container 400 due to imperfect information about the first container 300. For example, if the cuboid item 301 was mistakenly placed in the first container 300 whilst the second container 400 is required to only contain cylindrical items 302 and 303 but not the cuboid item 301 then the picking system must make a verification about which item has been picked.

In existing systems, an imaging unit 500 is typically employed to verify which item has been picked. In one example, the imaging unit 500 is a barcode reader arranged to read a barcode placed on each item. The identity of the item which has been picked, as determined by the barcode, may be compared to the expected identity of the item in the first container 300. Alternatively the imaging unit 500 may be an image-based object classifier arranged to verify the item 301, 302 or 303 based on computer vision techniques of taking an image of the item and determining the item thereby.

However, in the existing systems a significant time delay is present between the robot system 200 grasping the item, verifying the identity of the item and permitting placement of the item in the second container 400. For example, the robot system may be required to pass the item in front of a barcode scanner which may require the robot system to pause in front of the barcode scanner to permit scanning of the item's barcode.

Sometimes the robot system 200 occludes the barcode which prevents the successful scanning of the item's barcode and/or requires the robot system 200 to spend additional time manipulating the item to a more favourable orientation for barcode scanning. Similarly, the robot system 200 may be required to pause whilst images are taken of the item to allow image-based object classification of the item. Additionally, existing image-based object classification can only handle a few thousand item classes and therefore is not yet known whether they will scale up to handle industrial product ranges, which may be larger by one or more orders of magnitude.

Therefore, there is a need to more quickly and efficiently verify which item has been grasped by a robot system whilst also providing a solution which is scalable.

SUMMARY

In view of the problems in known picking systems, the present invention aims to provide an apparatus and method to reliably verify an item grasped by a robot system.

In general terms, the invention verifies the item which has been grasped by measuring a dynamics property of the item. Moreover, measurement of the dynamics property of the item allows the verification of the number of items currently held by a robot system. Similarly, measurement of the dynamics property of the item allows the determination as to whether the robot system has picked exactly one whole item, as opposed to part of one item.

According to the present invention there is provided a control unit for operation with a robot system comprising a sensor unit, the robot system arranged to grasp an item from a container. The control unit comprises a verification unit arranged to receive identifying information of an item expected to be in the container, receive information from the sensor unit indicative of a dynamics property of the item grasped by the robot system and verify that the item grasped by the robot system matches the item expected to be in the container based on the received identifying information and the received dynamics property information.

The present invention also provides a system comprising a robot system comprising a sensor unit, the robot system arranged to grasp an item and a control unit as previously described.

The present invention also provides a storage system comprising a first set of parallel rails or tracks extending in an X-direction, and a second set of parallel rails or tracks extending in a Y-direction transverse to the first set in a substantially horizontal plane to form a grid pattern comprising a plurality of grid spaces, a plurality of stacks of containers located beneath the rails, and arranged such that each stack is located within a footprint of a single grid space, at least one transporting device, the at least one transporting device being arranged to selectively move laterally in the X and Y directions, above the stacks on the rails and arranged to transport a container, a picking station arranged to receive a container transported by the at least one transporting device, a system as previously described, wherein the system is arranged to grasp an item from the container.

The present invention also provides a method for use with a robot system comprising a sensor unit, the robot system arranged to grasp an item from a container. The method comprises the steps of receiving identifying information of an item expected to be in the container, receiving information from the sensor unit indicative of a dynamics property of the item grasped by the robot system, and verifying that the item grasped by the robot system matches the item expected to be in the container based on the received identifying information and the received dynamics property information.

BRIEF DESCRIPTION OF THE DRAWINGS

Embodiments of the invention will now be described by way of example only with reference to the accompanying drawings, in which like reference numbers designate the same or corresponding parts, and in which:

FIG. 5 is a graph showing the force detected by a sensor unit varying with time when a robot system has picked a first item and a second item where the first and second items are similar.

FIG. 6 is a graph showing the torque detected by a sensor unit varying with time when a robot system has picked a first item and a second item where the first and second items are similar.

DETAILED DESCRIPTION OF EMBODIMENTS

First Embodiment

Figure 1:
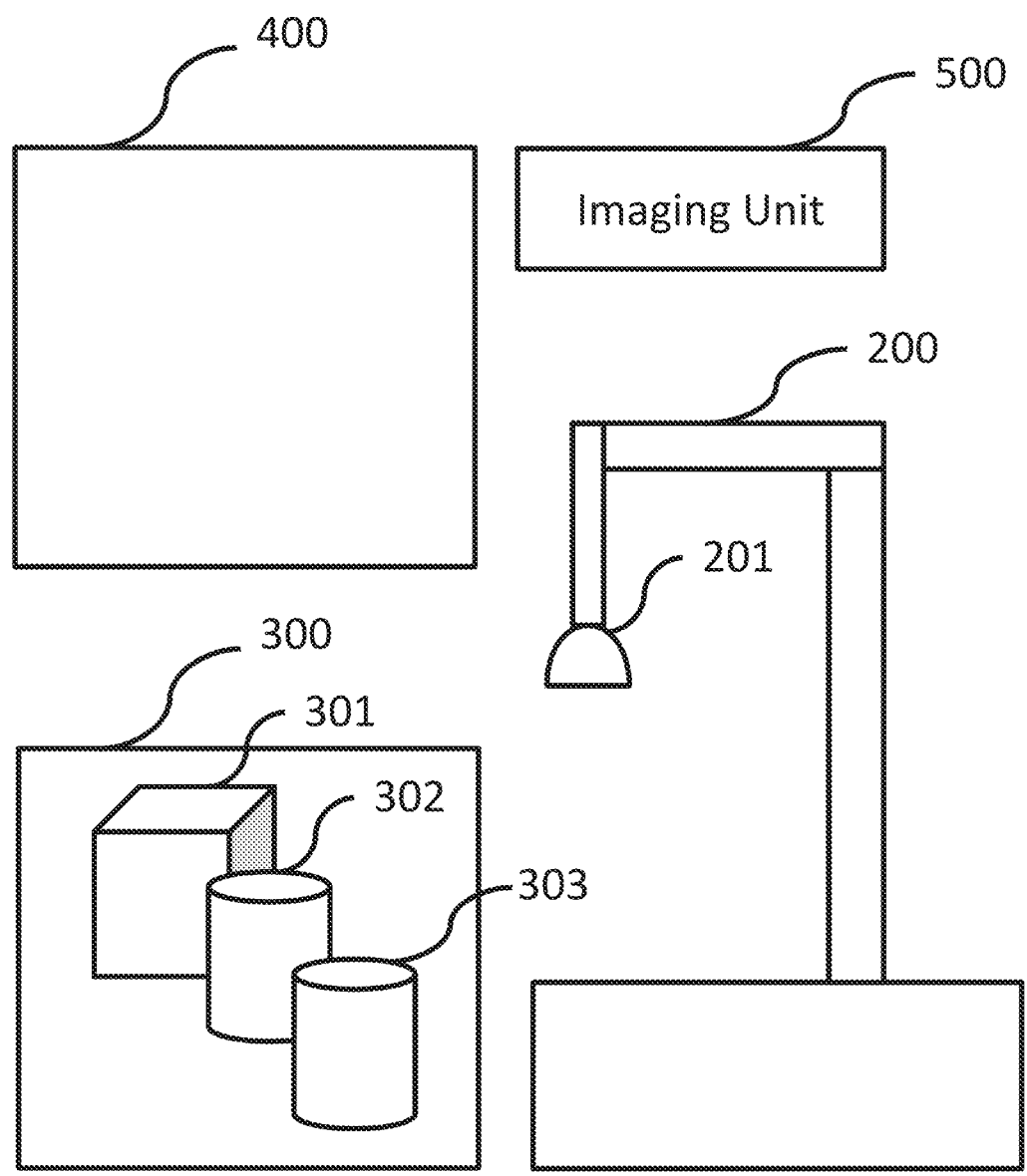
FIG. 1 is a schematic diagram of a picking system according to a known system.
Figure 2:
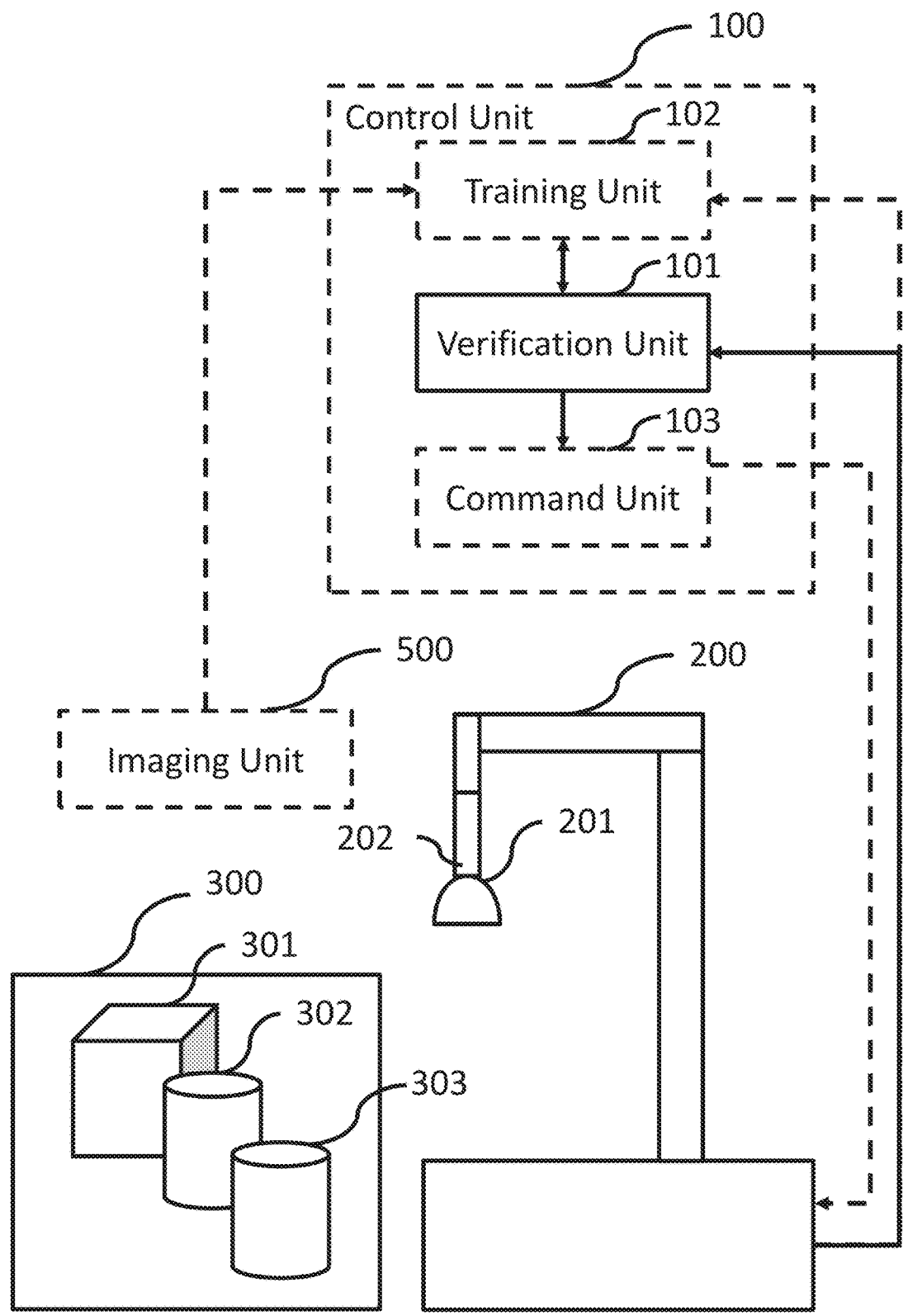
FIG. 2 is a schematic diagram a control device according to an embodiment of the present invention.

FIG. 2 depicts a system for grasping items from a container 300 together with a control unit 100 according to the first embodiment of the present invention. In this system, at a top level, a container 300 is provided and arranged to store at least one item. A robot system 200 is provided which is arranged to grasp an item from the container 300 and arranged to record information about an item grasped by the robot system 200. A control unit 100 according to the first embodiment of the present invention is arranged to receive the information recorded by the robot system 200 and arranged to verify that the item picked by the robot system 200 has a dynamics property which matches that expected from an item expected to be in the container 300.

In more detail, the container 300 as depicted contains three items at least one of which is desired to be moved from the container 300 by the robot system 200. In one example, the container 300 may be expected to contain only one type of item, wherein at least one of the one type of item is to be moved from the container 300 by the robot system 200. In this way, the picking system knows the type of item to expect to be in the container 300. However, the container 300 may comprise other items which are not the same type as other items in the container 300. For example, other types of items may be mistakenly placed in the container 300 or the container 300 may be arranged to contain more than one type of item. As will be appreciated, the container 300 can contain any number of items or no items at all. The container typically includes a lower surface, a floor, to support the items and walls, for example, walls to prevent items falling out. However, as will be appreciated, the container could be any size or configuration to hold items, for example, comprising three walls, five walls etc. Alternatively, the container 300 may have no walls and therefore only comprise a floor which in this configuration may be referred to as a pallet.

Ideally the items contained in the container 300 are positioned below the top of the walls, however, the first embodiment is equally applicable to a container in which the items extend above the top of the walls, for example, due to large items placed in the container 300 or due to a large number of items piled in the container 300. The container 300 shown in FIG. 2 comprises three items, a cuboid item 301, a first cylindrical item 302 and a second cylindrical item 303. As will be appreciated, the items may be any shape and not necessarily a cuboid or a cylinder.

Moreover, the container 300 may comprise an identifying means, such as a barcode or the like, so as to uniquely identify the container 300 amongst other containers. In this way, the picking system may identify the container 300 amongst other containers. For example, in a warehouse comprising a plurality of containers, the picking system may identify each container based on the identifying means. In this way, when items are placed in each container the picking system may record the items placed in each container. Before a robot system 200 is permitted to perform a picking action on the container 300 the picking system may be arranged to identify the container 300 and thereby recall the items the container 300 is meant to contain. The control unit 100 is arranged to verify whether the items 300-302 belong to/should be moved from the container 300 based, at least, on a dynamics property of each item.

The robot system 200 is provided to grasp an item from the container 300. In particular, the robot system 200 comprises an end effector 201 arranged to grasp an item. In FIG. 2 the end effector is shown to be a suction cup end effector 201 which relies on a vacuum to grasp an item. However, other end effectors may be used instead of a suction cup end effector. For example, a parallel jaw end effector may be used to grasp an item from the container 300. The robot system may thereby grasp an item 301-303 from the container 300. The robot system 200 further comprises a sensor unit 202 arranged to measure a dynamics property of the item 301-303. In this regard, the sensor unit 202 is envisaged to be arranged to measure any property that results from an item's motion relative to the sensor unit 202, including, but not limited to, the pressure, torque and/or force that the item exerts on the sensor unit 202, the acceleration that the item induces on the sensor unit 202, the sound of the item's contents shifting, and/or the shear force that the object exerts on a sensor unit 202 as the item slips.

The robot system 200 may be further arranged to move the grasped item 301-303 from the first container 300 to a second container (not shown). The first container 300 may thereby contain items in a warehouse inventory system and the second container may be arranged to contain those items which a customer has ordered from the warehouse inventory system. Therefore the robot system 200 may be arranged to selectively grasp those items from the first container 300 which the customer has ordered and then to place the items in the second container for transport to the customer. Therefore, the robot system transfers an item from the first container 300 to the second container. Accordingly, to ensure the order for the customer is correct it is important that the item grasped is the correct item.

A control unit 100 according to a first embodiment of the present invention receives the measured information from the sensor unit 202 indicative of the dynamics property of the item 301-303. The control unit 100 is also arranged to receive information identifying an item expected to be in the container 300. Based on the received information the control unit 100 is arranged to verify that the item 301-303 picked by the robot system 200 has a dynamics property expected of the item expected to be in the container. The dynamics property is envisaged to be at least one of the inertial property of the item, the damping property of the item and/or the sound of the item and its contents. Similarly, the dynamics property is envisaged to include properties that are induced by motion. For example, the dynamics property is envisaged to include a shear-force property which, for example, is induced by a robot system 200 moving the item in manner in which the item slips in the end effector and using the slip as a measure of friction between the end effector and the item. For example, an end effector could actively rub its fingers over the surface of the item or cause the item to slip whilst the end effector grips the item. It will be appreciated, that although reference is made to a dynamics property, one or more dynamics property may be measured at any one time to thereby provide information on the item suitable for its verification. For example, both an inertial property and damping property may be measured at the same time to provide the information necessary for item verification.

For example, the picking system may have recorded that the container 300 only contains first cylindrical items 302 where first cylindrical items 302 each comprise a solid item such as a jar of tomato sauce product. However, due to errors when packing the container 300 (such as due to a human placing wrong items in the container 300) amongst first cylindrical items 302 may also be the second cylindrical item 303, where the second cylindrical item 303 contains a jar of pickles product. Accordingly, based on the shape of the item alone it would not be possible to differentiate between the items. Traditional techniques are slow, typically requiring the item to pause in front of a barcode scanner.

Instead, the first embodiment of the present invention relies on dynamics properties of the item to thereby verify that the item being grasped is the expected item. In particular, verification of the item is performed by measuring how the item responds as the item is being moved. For example, where the robot system 200 is transferring an item from the first container 300 to a second container (not shown), verification of the item may be performed whilst the robot system 200 transfers the item. Therefore, a speed increase is realised because the robot system 200 need not pause in front of a barcode scanner. Instead, the necessary movement of the item from a first container 300 to a second container is used to also verify the identity of the item. The first embodiment of the present invention provides the advantage of increasing the efficiency of item transfer by removing the need for the robot system 200 to pause for item verification by an imaging unit.

In one example, by moving the item 301-303 a force/torque is exerted on the item 301-303 which causes the item to accelerate. The acceleration of the item corresponds to a dynamics property of the item 301-303. In this example, the jar of tomato sauce product will move in a manner different to the jar of pickles product, for example, the (homogenous) jar of tomato sauce product will exhibit different dynamics properties (such as different sloshing characteristics) to the jar of pickles product which contains large solids in the form of pickles. The sloshing will thereby impart a force/torque on the sensor unit 202 which is arranged to measure such a force/torque. Based on the measured force/torque the control unit 100 is arranged to verify the item by comparing the dynamics property of the item with the dynamics property of the item expected to be in the container. For example, the comparison may be performed using a statistical model, using machine learning, to determine the amount of similarity between the dynamics measured by the sensor unit 202 and the expected dynamics of the item expected to be in the container. Preferably, the statistical model is arranged to handle noise and drift (such as temperature drift) in the measurement obtained from the sensor unit 202. For example, the sensor unit 202 output may result from variations in the item's pose relative to the end effector. Moreover, when different sensor units 202 are used, the statistical model may be arranged to generalise across the multiple sensor units 202. Alternatively, the statistical model may be trained for a specific sensor unit 202.

In the above example, the sensor unit 202 disclosed is arranged to measure a force and/or a torque. However, other properties of measurement are envisaged, namely properties that result from an item's motion relative to the sensor unit 202, including, but not limited to, the pressure that the item exerts on the sensor unit 202, the acceleration that the item induces on the sensor unit 202, the sound of the item's contents shifting, and/or the shear force that the object exerts on a sensor unit 202 as the item slips.

Although the above example refers to a solid item being compared to a liquid item, it is envisaged that any type of item could be compared. For example, if the cuboid item 301 contained a different solid item, such as bread, then the dynamics property of the bread item and cake item of the first cylindrical item 302 would be more similar than to the water item of the second cylindrical item 303. However, with an appropriately trained statistical model the difference between the items could be ascertained and therefore the item picked verified by the control unit 100. Moreover, counting the number of items transferred from one container to another may be used to determine that the correct number of items for a particular order have been picked.

The system depicted in FIG. 2 may, optionally, further comprise an imaging unit 500. The imaging unit is arranged to receive information indicative of the item. For example, the imaging unit 500 may comprise a barcode scanner and/or a computer vision imager. Such an imaging unit 500 may be utilised during training of the control unit 100 to identify items 301-303. In particular, as in a traditional system, during movement of an item from a first container 300 to a second container the dynamics property of the item is recorded by the sensor unit 202 which is transmitted to the control unit 100. However, initially, the control unit 100 will not be aware of which item the robot system 200 has grasped and therefore will be unable to verify that the item picked is the item expected to be in the container. Therefore the robot system 200 will be commanded to also image the item, in the traditional manner, by way of a barcode scanner and/or a computer vision imager. In this way, the control unit 100 may receive an indication from the imaging unit 500 as to the identity of the item. Therefore, once sufficient training information has been gathered, the control unit 100 will be able to successfully verify the item when it is subsequently grasped by the robot system 200, without requiring the robot system 200 to pass the item by an imaging unit 500.

The control unit 100 according to the first embodiment comprises a verification unit 101. Optionally, the control unit 100 may comprise a training unit 102 and/or a command unit 103.

The verification unit 101 is arranged to receive information from the sensor unit 202 indicative of a dynamics property of the item picked by the robot system 200. Moreover, the verification unit 101 is arranged to receive identifying information of an item expected to be in the container 300. The verification unit 101 is further arranged to verify that the item picked by the robot system 200 is the same as the item expected to be in the container 300. This may be performed using a statistical model arranged to find the similarity between a dynamics property of the item expected to be in the container and the item currently picked by the robot system 200.

The statistical model may be arranged to take as input an identifier for the expected item/class of items, and the measured dynamics property. It may either receive the measurements as a batch, after the robot system 200 has transported the item to a certain point, or it may receive the measurements as a stream, so that it processes each measurement as it is made. In the former case, the statistical model may be arranged to produce as output the probability that the measured dynamics property is indicative of the robot system 200 having picked up the expected item. In the latter case, the statistical model may be arranged to produce as output a stream of such probabilities, for instance one per incoming measurement. In the former case, the output probability may be compared to a predetermined threshold to thereby decide whether or not the robot system 200 has picked the expected item. In the latter case, the stream of probabilities may be assessed to determine whether or not the robot system 200 has picked the expected item.

For any given expected item/class identifier, the statistical model may take the form of a standard machine learning model, such as an artificial neural network or a Gaussian process classifier. The statistical model may optionally incorporate prior information about the dynamics of accelerating objects, such as an acceleration-invariant dynamics property.

In this way, the control unit 100 is arranged to receive dynamics property information from the robot system 200 and thereby verify the item or class of items being grasped by the robot system 200. In particular, the verification is invariant to the location of the robot system 200 and minor variations in the route taken by the robot system 200 from a first container to a second container.

Optionally, the control unit 100 may further comprise a training unit 102. The training unit 102 is arranged to, when the verification unit 101 is unable to verify the item being grasped, train the statistical model based on the measured sensor information and an item identifier. More specifically, the training unit 102 is arranged to receive information indicative of a dynamics property of the item being grasped by the robot system 200. Moreover, the training unit 102 is further arranged to receive an item identifier. For example, the item identifier may be received from an imaging unit 500 in the form of a barcode or image-based object classification. Based on the received information the training unit 102 is arranged to re-train the statistical model. In this way, when the same item/class of items is grasped at a future time then the verification unit 101 will be able to correctly verify the item based on the information trained by the training unit 102. For example, the training unit 102 may be arranged to update the statistical model by re-training the statistical model using the received item identifier and information indicative of the dynamics property of the item. In this way, new items to be grasped by the robot system 200 are inducted into the statistical model so that when the item is picked by the robot system 200 at a future time then it will be verified by the verification unit 102.

Other information may be included in the trained statistical model to increase its accuracy. For example, an item's nominal weight, dimensions, etc. In this way classes of statistical models may be found, where each statistical model within a class is defined by the nominal parameters. Advantageously, this reduces the amount of storage space needed, and reduces the amount of training data needed.

Alternatively, the verification unit 101 may be arranged to only detect classes of items such as all boxes of tea forming one class and all bottled beverages forming another. Therefore, the training unit 102, instead of training the statistical model on a particular stock keeping unit 'SKU', for example, a particular brand of a particular size of a box of tea, would be trained on classes of SKUs. In this way, the need to capture training information for each SKU is avoided. Instead, the size and stated weight of certain SKUs could be used to automatically classify the SKU in a particular class of SKUs for which the same associated measured sensor information as other SKUs in the same class would be applied. In this regard, it is envisaged that a relationship would need to be established between a nominal weight/size of a SKU and the associated dynamics property. SKUs may manually be clustered into classes, in which case, it may suffice to examine a fraction of the SKUs within a class for determining the nature of the relationship. Alternatively, SKUs may be automatically clustered which may need the capturing of training information for each SKU or the use of simpler statistical models within each class requiring less training information. A robot system 200 comprising a force sensing means/torque sensing means (such as a sensor unit 202 arranged to measure a force and/or a torque) may be used to automatically determine a nominal weight of a SKU. In particular, a robot system 200 may statically determine a SKU's weight by measuring, when the robot system 200 has grasped and lifted the item but is not moving, the force exerted on the end effector due to the gravitational field. The gravitational field strength being known at the location of the robot system 200 thereby permits the calculation of the weight of the item.

Although, the term "item" has been used to refer to both types of item (e.g. a particular brand of a particular size of a box of tea—which would have a unique stock keeping unit (SKU) code) and to specific items (e.g. a specific box of tea which has been picked). It is envisaged that 'item' may be used more broadly still. For example, although two items may have the same SKU code i.e. relate to the same brand and size of a box of tea, there may be slight weight and/or dynamic property differences due to manufacturing differences and/or distribution of the contents of the box. To this end, the above described verification method may take these factors into account when determining a verification. For example, an average weight or a lower bound of weight may be used.

The control unit 100 may also optionally comprise a command unit 103. The command unit 103 is arranged to command the robot system 200 to move in a predetermined manner. For example, the command unit 103 may be arranged to command the robot system 200 to move in a particular manner prior to verification by the verification unit 101 of the item. In this way a certain pattern of movement by the robot system 200 may be used to accentuate distinguishing features of a given item's measured dynamics property. Additionally or alternatively, the command unit 103 may be arranged to command the robot system 200 to move in a predetermined manner after the verification unit 101 fails to verify the item. For example, if a first predetermined manner of movement fails to identify the item then a second, different, predetermined manner of movement, for which corresponding dynamics property information is trained in a statistical model, may allow the verification unit 101 to verify the item. Therefore, a more accurate verification of the item can be made without use of the imaging unit 500.

Figure 3:
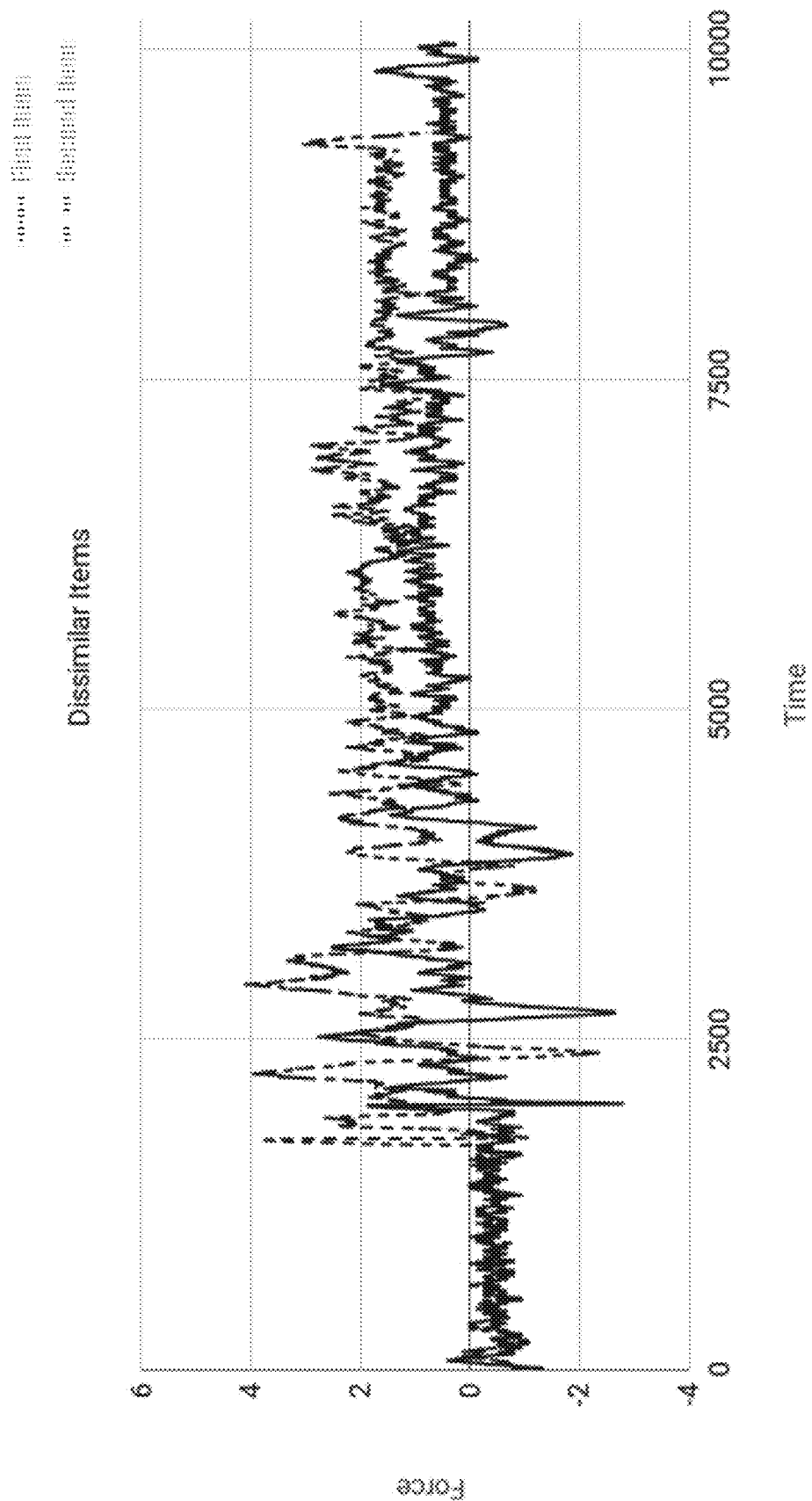
FIG. 3 is a graph showing the force detected by a sensor unit varying with time when a robot system has picked a first item and a second item where the first and second items are dissimilar.

FIG. 3 is a graph plotting time versus a force measured by the sensor unit 202. The graph shows the measured force for both of a first item and a second item, where the first item and the second item are dissimilar. For example, the first item may be a bread item whilst the second item is a drink item. The force measurements were taken whilst the robot system 200 performed a predetermined movement. The plotted lines for each item are substantially different. Therefore indicating a relatively individual force versus time signature for each item/class of items.

Figure 4:
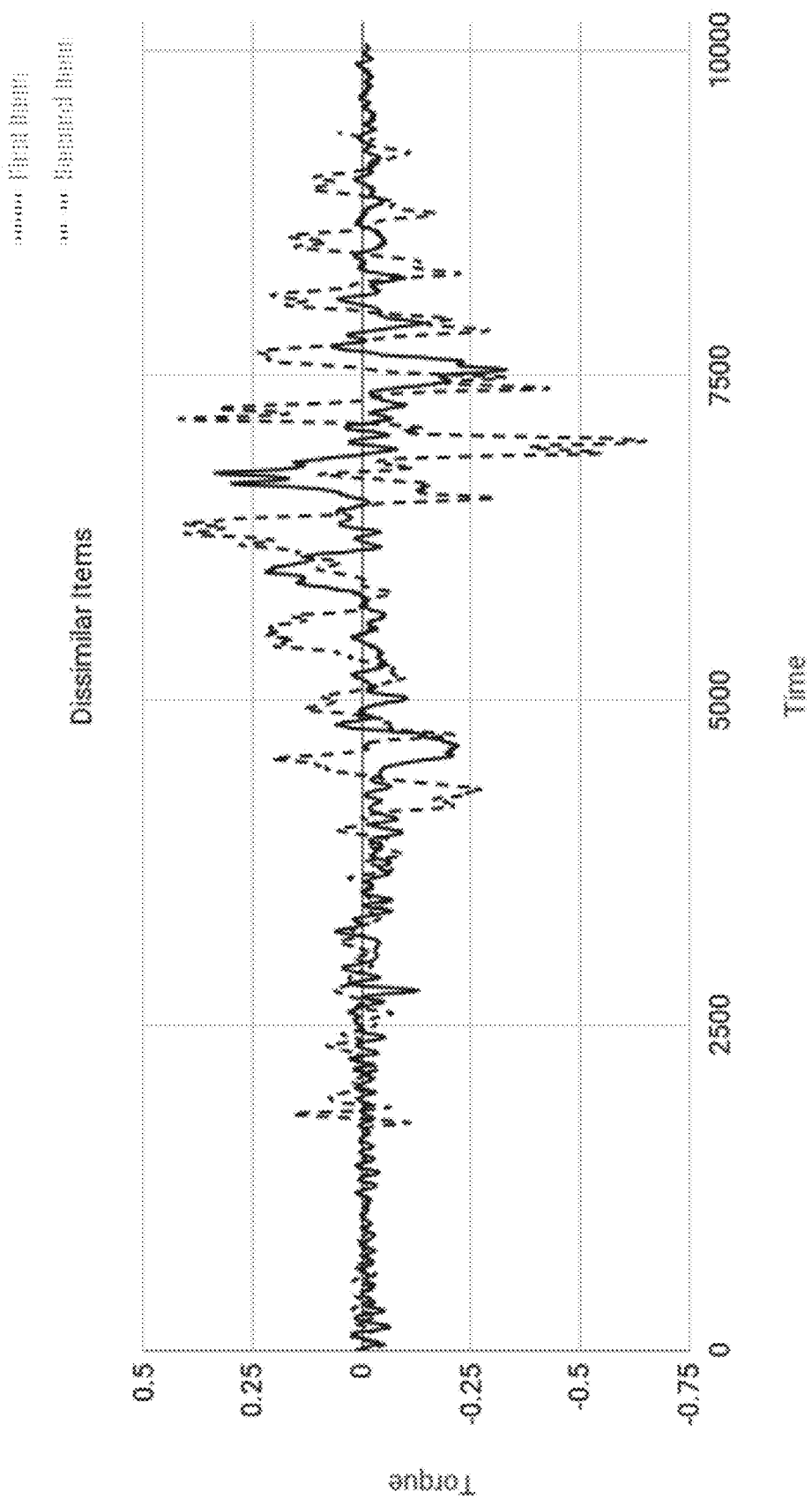
FIG. 4 is a graph showing the torque detected by a sensor unit varying with time when a robot system has picked a first item and a second item where the first and second items are dissimilar.

Similarly, FIG. 4 shows a graph plotting time versus a torque measured by the sensor unit 202. In FIG. 4 torque measurements are made for two dissimilar items. As for FIG. 3, the plotted lines are substantially different indicating different torque signatures for each item. In both of FIGS. 3 and 4 forces and torques are measured around one axis. However, force and/or torque could be measured around an additional axis to generate a more individual signature for each item/class of items based on force and/or torque measurements around at least one axis.

Figure 5:
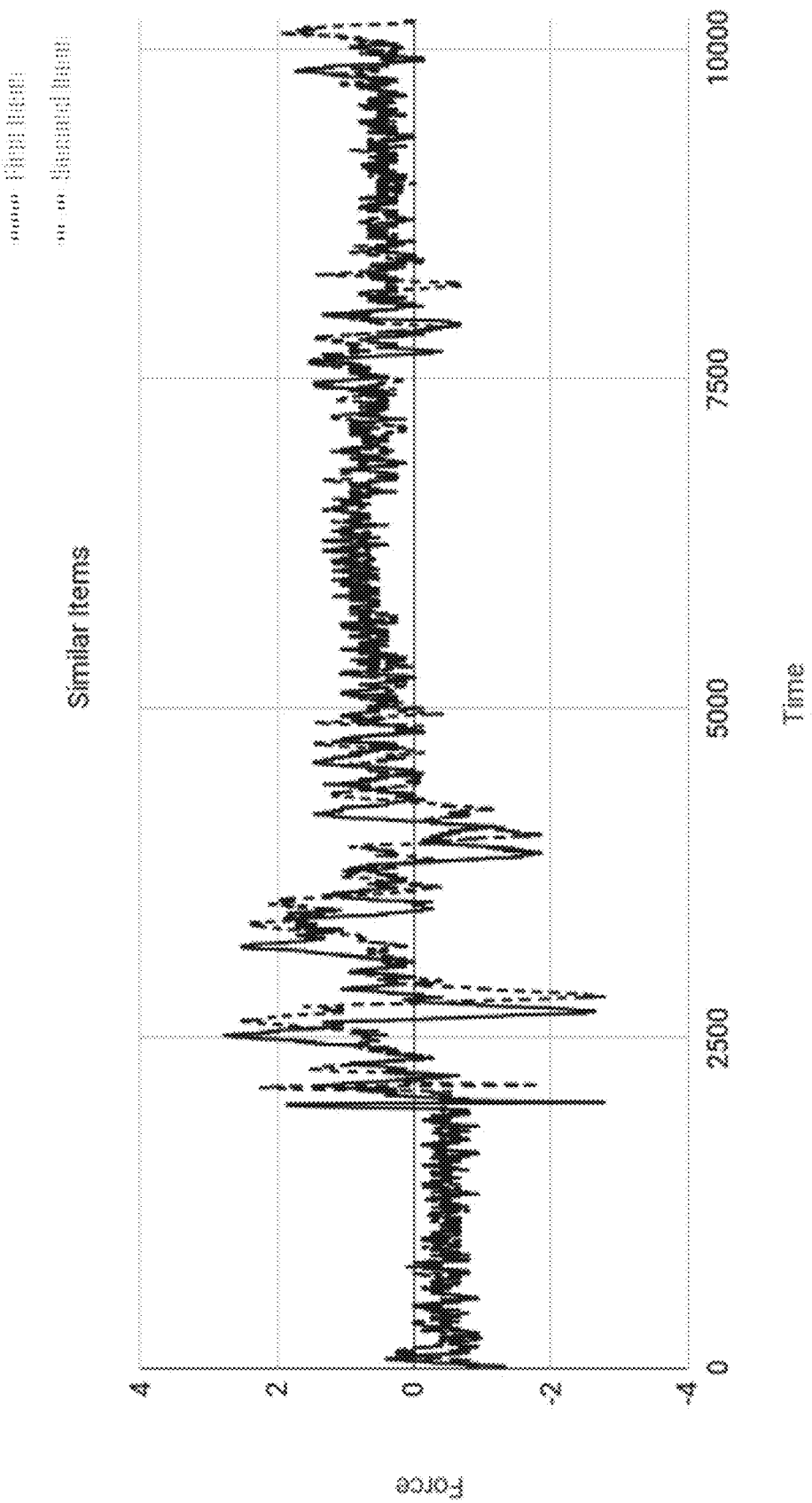

FIG. 5 shows a graph plotting time versus a force for two items which are similar. As shown in FIG. 5 the lines plotted by the measured force are substantially similar for the first and second items. Therefore a control unit 100 comprising information about the force versus time plot for a first item would be able to determine from the force versus time plot for a second item that the first and second item are the same type of item/the same class of item.

Figure 6:
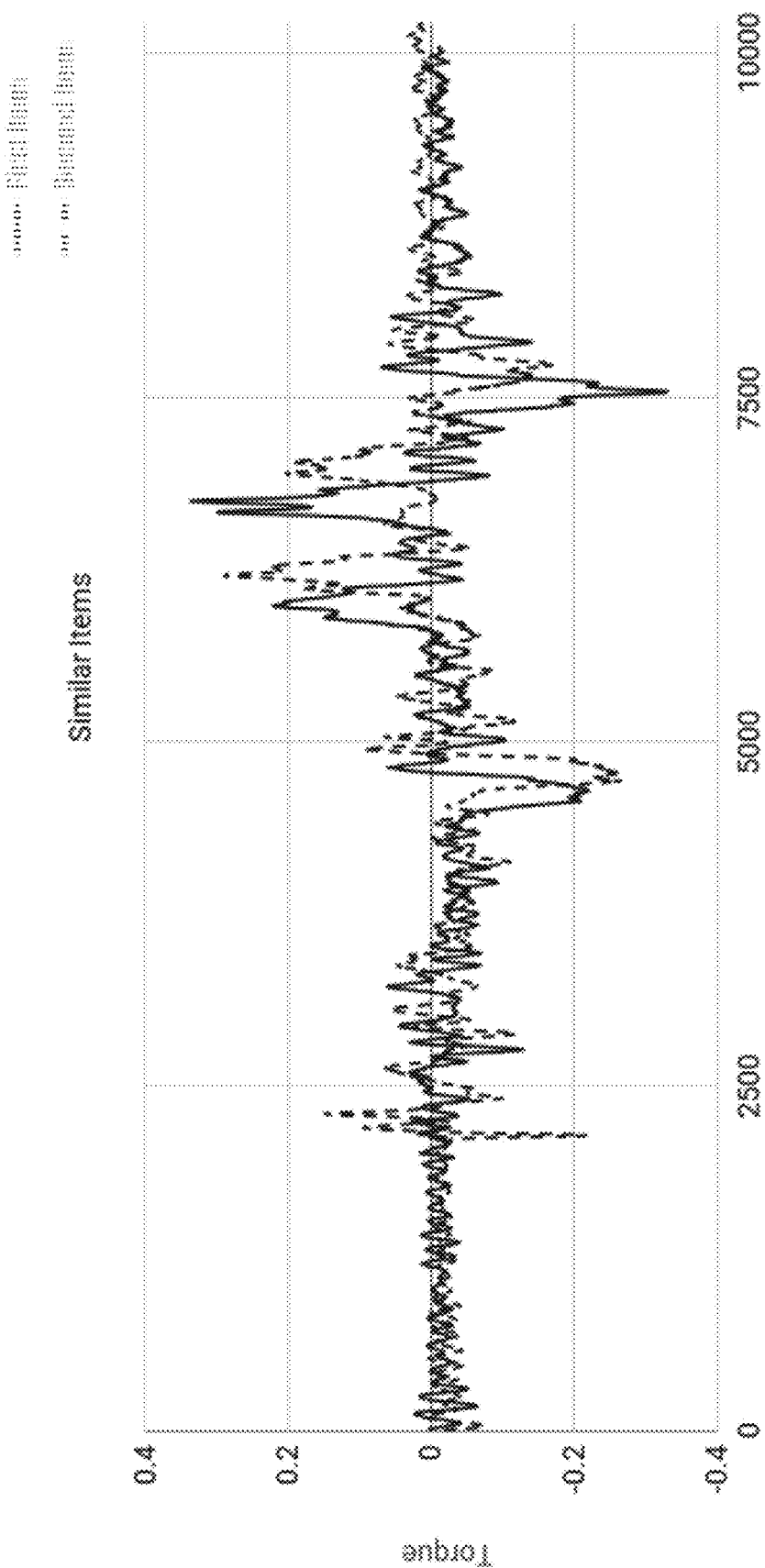

Similarly, FIG. 6 is a graph plotting time versus torque for two similar items. As with FIG. 5 the two lines plotted by the torque measurement are substantially similar thereby indicating that each item/class of item has a signature which may be associated therewith.

As explained previously, the optional command unit 103 may be arranged to command the robot system 200 to perform predetermined maneuvers. In one example, to gather information about a dynamics property of the item, the robot system 200 may be commanded to rotate the end effector 201 whilst the end effector 201 is moving from a first container to a second container. In this way, additional dynamics information compared to that of simpler trajectories may be gathered without increasing the time taken to reach the second container.

Figure 7A:
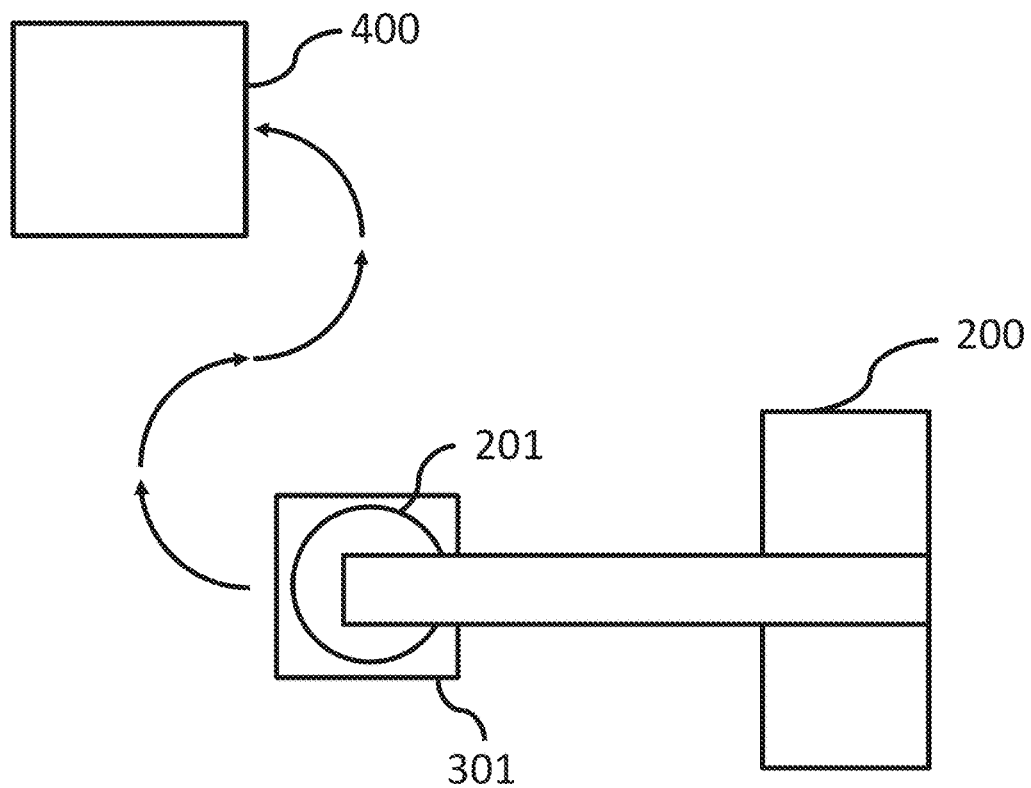
FIGS. 7a and 7b are schematic diagrams showing the robot system performing predetermined maneuvers whilst grasping an item.

FIG. 7a shows an example of a predetermined maneuver which may be taken by a robot system 200 to move a grasped item 301 by an end effector 201 to a second container 400 (which is the destination container). In this example, the robot system 200 may have grasped the item 301 from a first container (not shown) for transport to the second container 400. With the control unit 100 according to the first embodiment, advantageously, the robot system 200 need not pause in one location to perform a barcode scanning procedure. Instead, the robot system 200 can transport the item 301 to the second container 400 without stopping.

Although a simple arcing motion from a first container to a second container 400 is envisaged (comprising an upward motion of the end effector, lateral translation and downward motion of the end effector), other alternatives are available. For example, an arcing motion may not provide enough measured sensor information for the verification unit 101 to accurately verify the item/class of items. Accordingly, other predetermined movements are envisaged. FIG. 7a shows a movement which may be performed prior to verification of the item/class of items by the verification unit 101. In this example, multiple accelerations and decelerations are performed along different axes to provide the potential to measure more sensor information to assist in item identification. However, in the predetermined maneuver shown in FIG. 7a, a marginally longer route is taken to the second container 400.

Figure 7B:
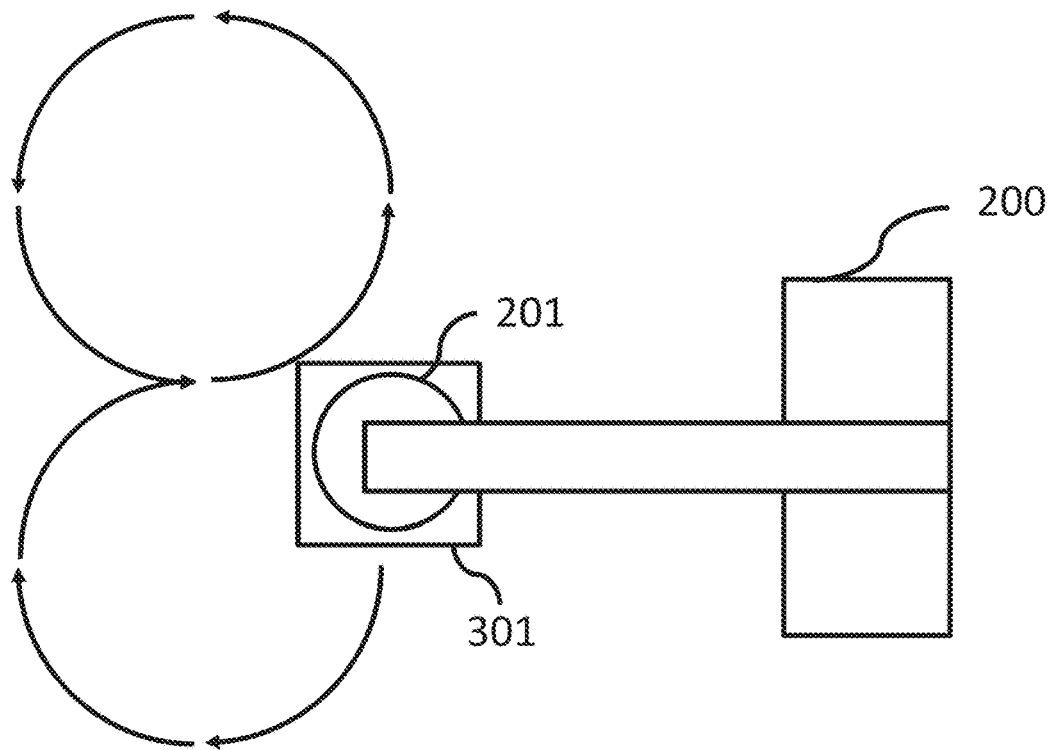

FIG. 7b shows another predetermined maneuver which may be commanded by the command unit 103. For example, the maneuver of FIG. 7b may be commanded after the maneuver of FIG. 7a has been performed (and therefore the item 301 is above the second container 400) but the verification unit 101 has been unable to identify the item/class of items. Instead of relying on an imaging unit 500 there is envisaged to perform another maneuver to gather further sensor information with more accelerations/decelerations. Therefore the maneuver of FIG. 7b includes more movements than in FIG. 7a whilst the starting position and ending position of the item 301 are the same. In this way, after performing the maneuver of FIG. 7b and after the verification unit 101 has successfully verified the item/class of items then the robot system 200 can place the item 301 in the second container 400. However, this maneuver may take too much time and therefore, in some cases, it may be faster to utilise an imaging unit 500 to detect the identity of the item.

Figure 8:
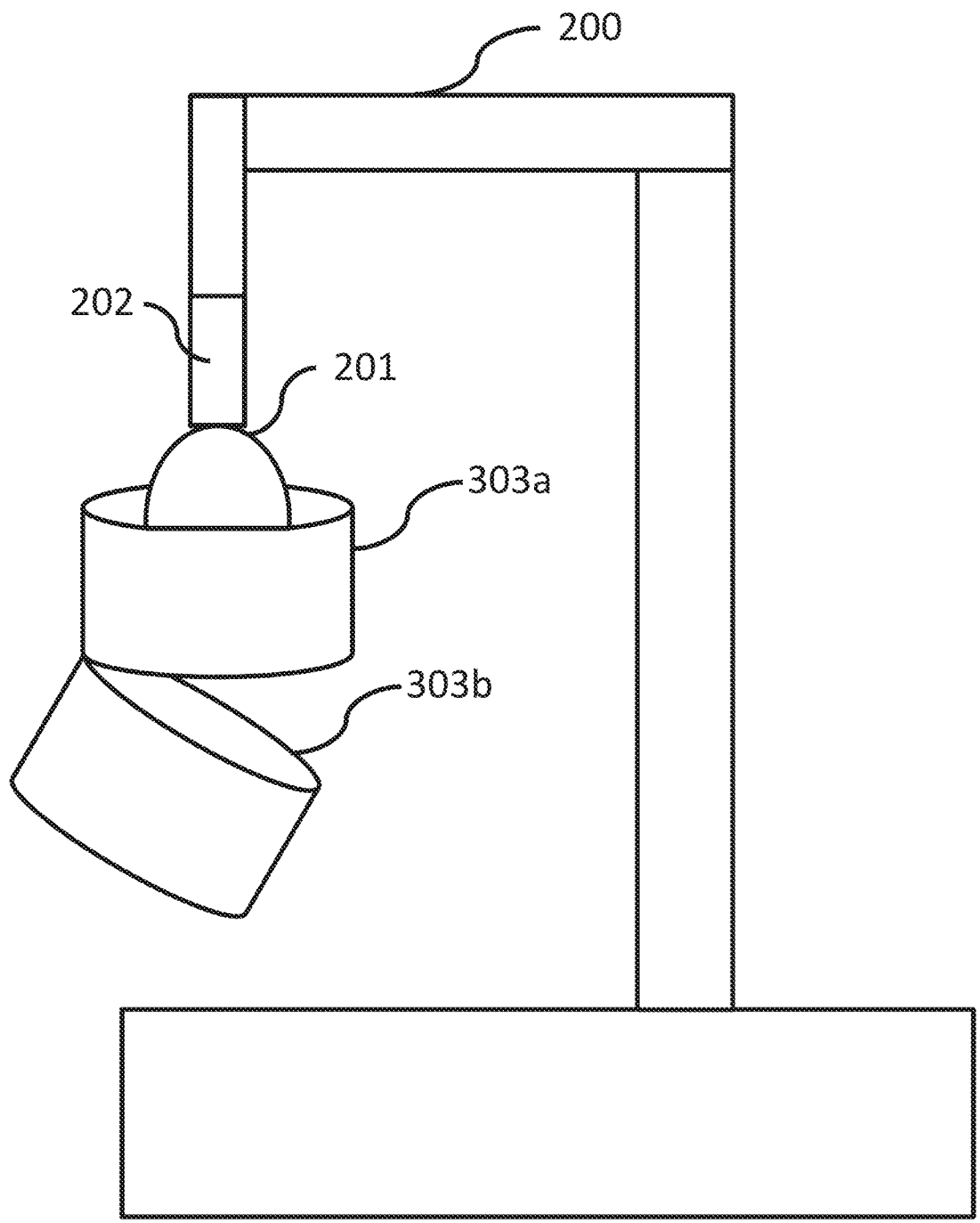
FIG. 8 is a schematic diagram showing a robot system grasping a damaged item.

FIG. 8 shows another application of the control unit 100 according to the first embodiment of the present invention. In particular, the verification unit 101 may be arranged to detect a damaged/incomplete item. For example, the robot system 200 may grasp the item 303. However, as shown in FIG. 8 the item 303 may be damaged so that it breaks into a first part 303a and a second part 303b. The damage may therefore be detected by the control unit 100 because the dynamics property measured by the sensor unit 202 are different from those of the item expected to be in the container 300. Therefore, the robot system 200 may be further arranged to place the item 303 in a location to dispose of the item 303 or otherwise repair the item 303. Similarly, if the item is incomplete, for example, the second part 303b is fully disconnected from the first part 303a then the control unit 100 may also be able to detect that the item is incomplete.

Similar to a damaged item, the verification unit 101 may be arranged to detect, based on the information from the sensor unit 202, that a dynamics property of the item has changed in a manner indicative of the item being incomplete.

Moreover, the control unit 100 may be arranged to identify whether the item grasped by the end effector 200 comprises a plurality of items. For example, an additional item may have adhered to the item being picked. Accordingly, when the robot system 200 picks a first item, the second item adhered thereto will move together with the first item as the robot system 200 moves the first item from a first container to a second container. The addition of the second item changes the dynamics properties of the first item in a manner which is detectable by the control unit 100.

Additionally, the control unit 100 may be arranged to count the number of items transferred from one container to another container. In this way, the number of items transferred may be compared to the number of items expected to be placed in a particular customer's order. Therefore, the control unit 100 may be arranged to have the robot system continue picking items until the expected number to be placed in the customer's order has been reached at which point the control unit 100 may be arranged to stop the robot system picking any further items.

Figure 9:
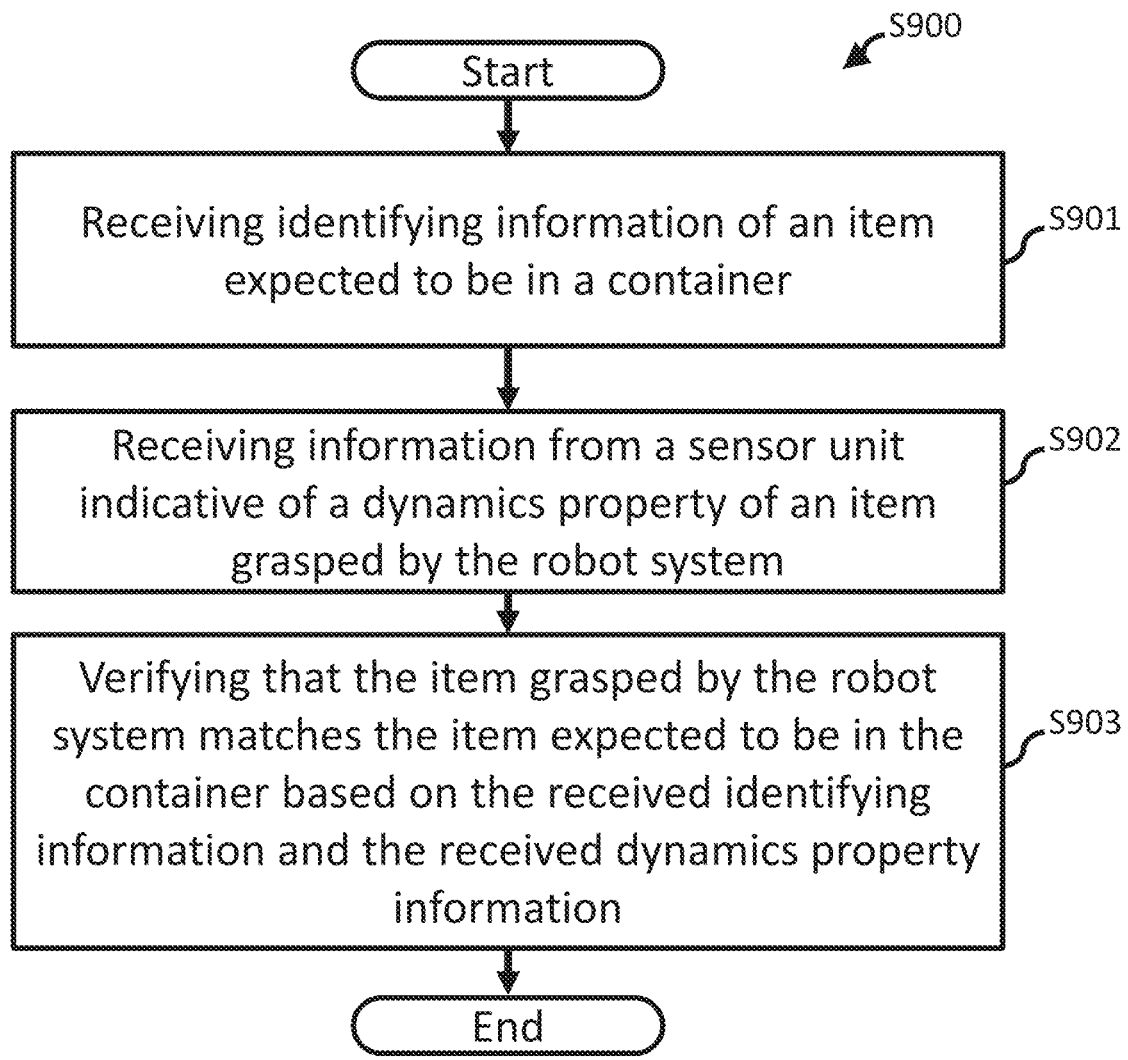
FIG. 9 is a flowchart of the processes performed by the control unit according to a first embodiment of the present invention.

FIG. 9 shows the processes performed to identify an item using a dynamics property received from a sensor unit 202 of a robot system 200, according to the first embodiment.

Referring to FIG. 9, at step S901 information about an item identifier (such as a barcode, product name or the like) is received. For example, the item identifier may be received from a picking system arranged to manage containers and their contents within a warehouse. The picking system may have knowledge of the container and its expected contents. The identification of the item in the container may therefore be transmitted to step S901.

At step S902, the method receives information from the sensor unit 202 indicative of a dynamics property of the item. In this regard, the sensor unit 202 is envisaged to be arranged to measure any property that results from an item's motion relative to the sensor unit 202, including, but not limited to, the pressure, torque and/or force that the item exerts on the sensor unit 202, the acceleration that the item induces on the sensor unit 202, the sound of the item's contents shifting, and/or the shear force that the object exerts on a sensor unit 202 as the item slips.

At step S903, the picked item/class of items is verified based on the received dynamics property and the information received in steps S901 and S902. In other words, the information received in step S902 is compared to the statistical model of the dynamics property of the items/classes of items expected to be in the container. When the received information matches the statistical model expectations then the step S903 verifies the item picked as being one expected to be in the container. Although this may be applied to individual items, it may equally be applied to classes of items, such as boxes of tea forming one class whilst bottles of beverage forming another class.

In this way, item verification is performed in a manner which reduces the time required by traditional techniques.

Modifications and Variations

Many modifications and variations can be made to the embodiments described above, without departing from the scope of the present invention.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 10 to 13 of the accompanying drawings.

Figure 10:
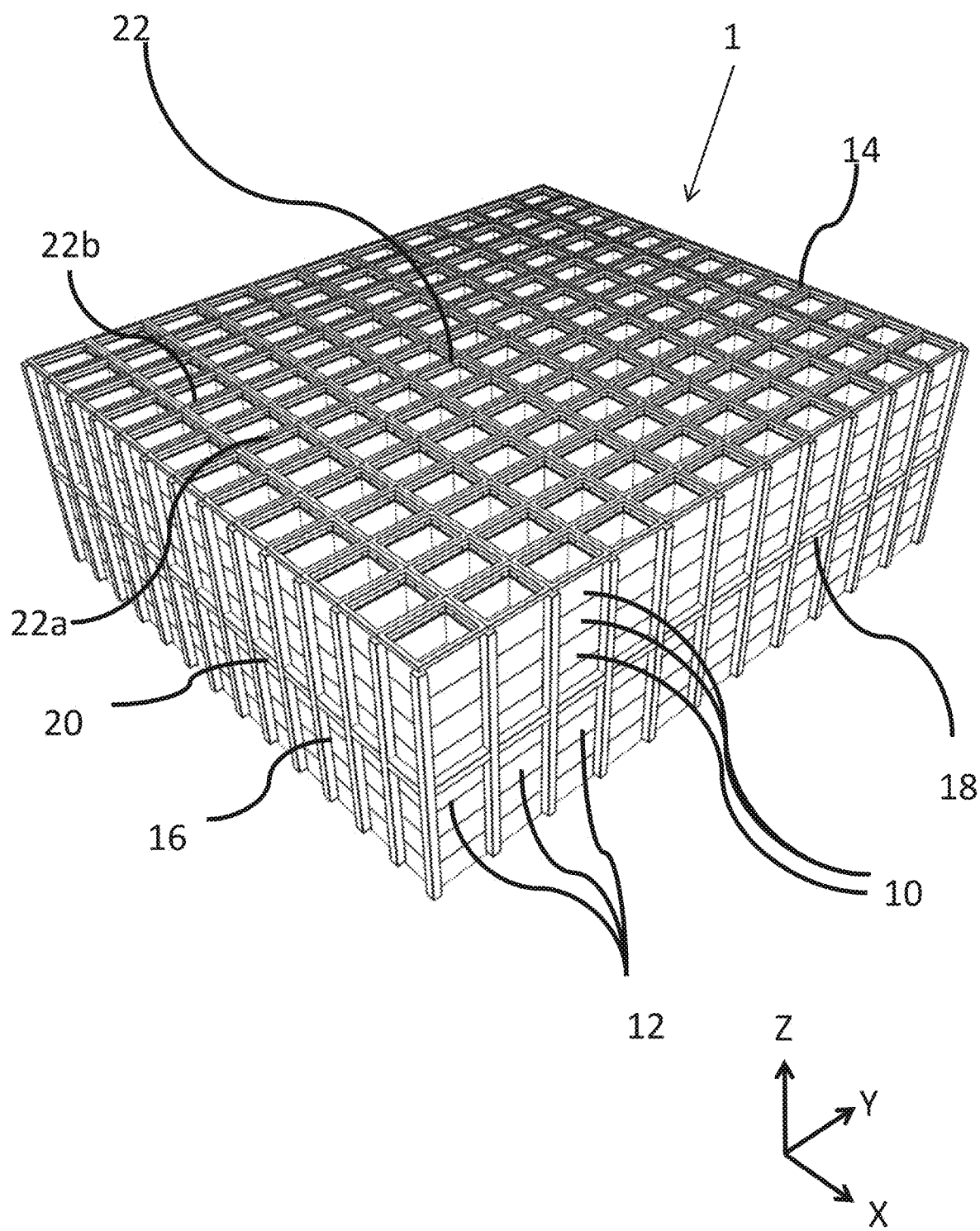
FIG. 10 is a schematic diagram of a framework structure according to a known system.
Figure 11:
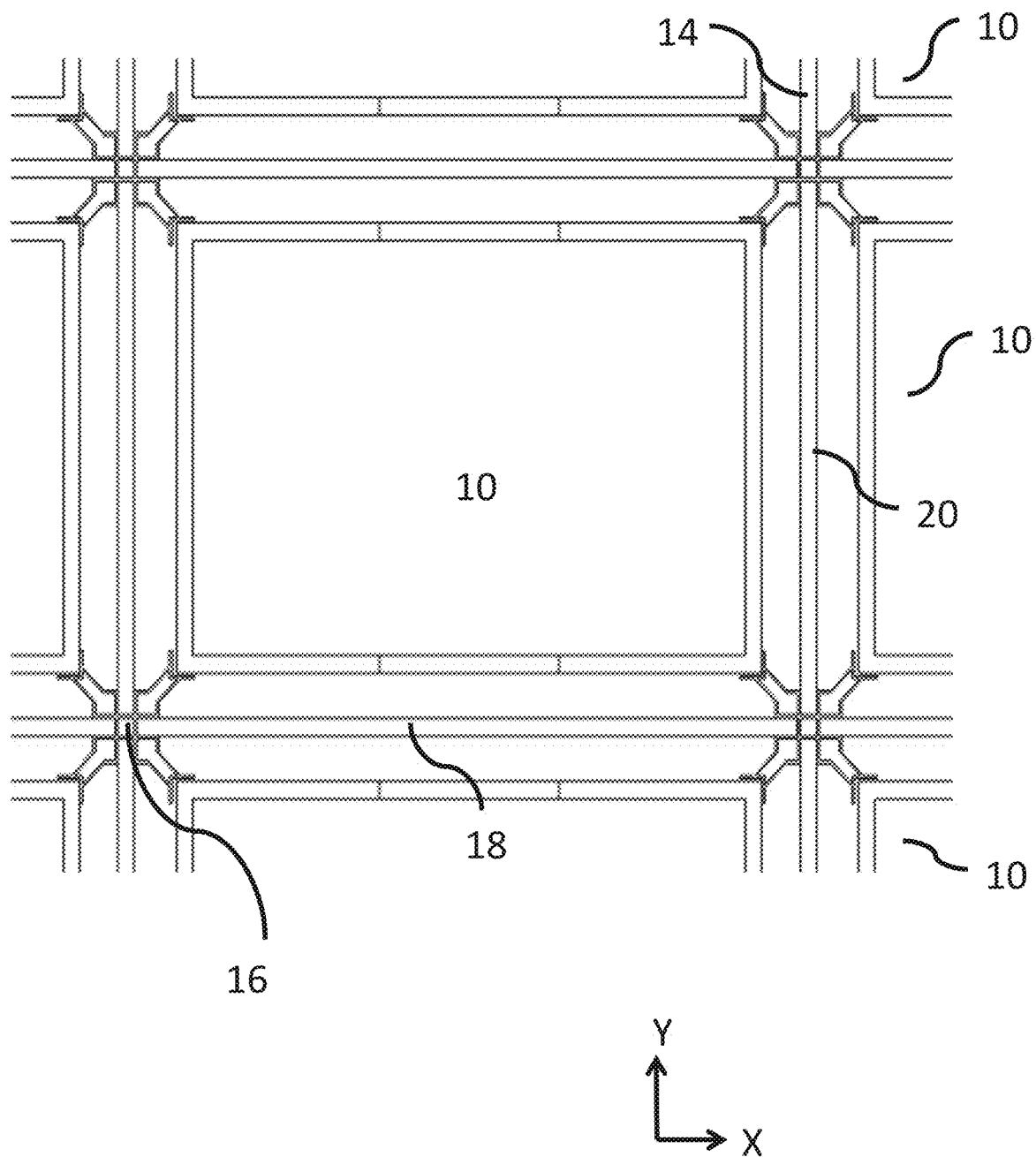
FIG. 11 is a schematic diagram of a top-down view showing a stack of bins arranged within the framework structure of FIG. 10.

As shown in FIGS. 10 and 11, stackable containers, known as bins 10, are stacked on top of one another to form stacks 12. The stacks 12 are arranged in a grid framework structure 14 in a warehousing or manufacturing environment. FIG. 10 is a schematic perspective view of the framework structure 14, and FIG. 11 is a top-down view showing a stack 12 of bins 10 arranged within the framework structure 14. Each bin 10 typically holds a plurality of product items (not shown), and the product items within a bin 10 may be identical, or may be of different product types depending on the application.

The framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, are typically manufactured from metal. The bins 10 are stacked between the members 16, 18, 20 of the framework structure 14, so that the framework structure 14 guards against horizontal movement of the stacks 12 of bins 10, and guides vertical movement of the bins 10.

Figure 12C:
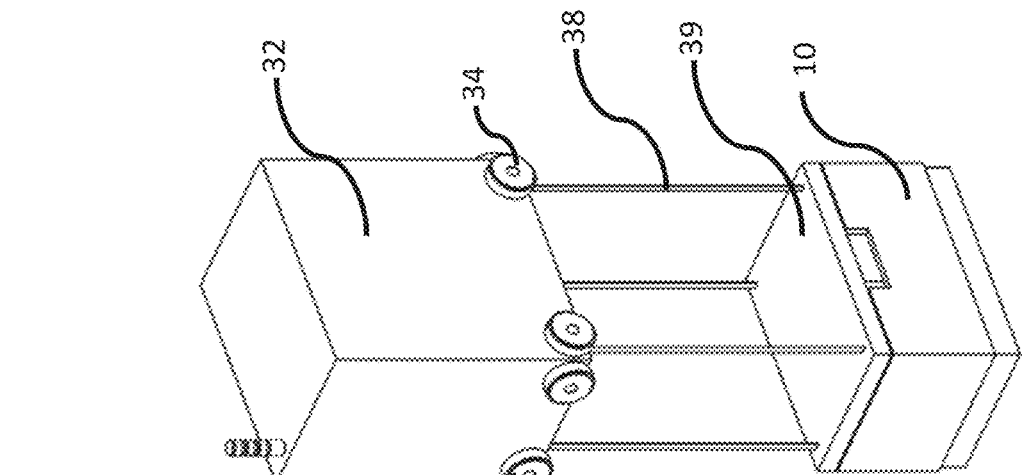
FIGS. 12(*a*) and 12(*b*) are schematic perspective views of a load handling device depositing a bin and FIG. 12(*c*) is a schematic front perspective view of a load handling device lifting a bin.
Figure 12B:
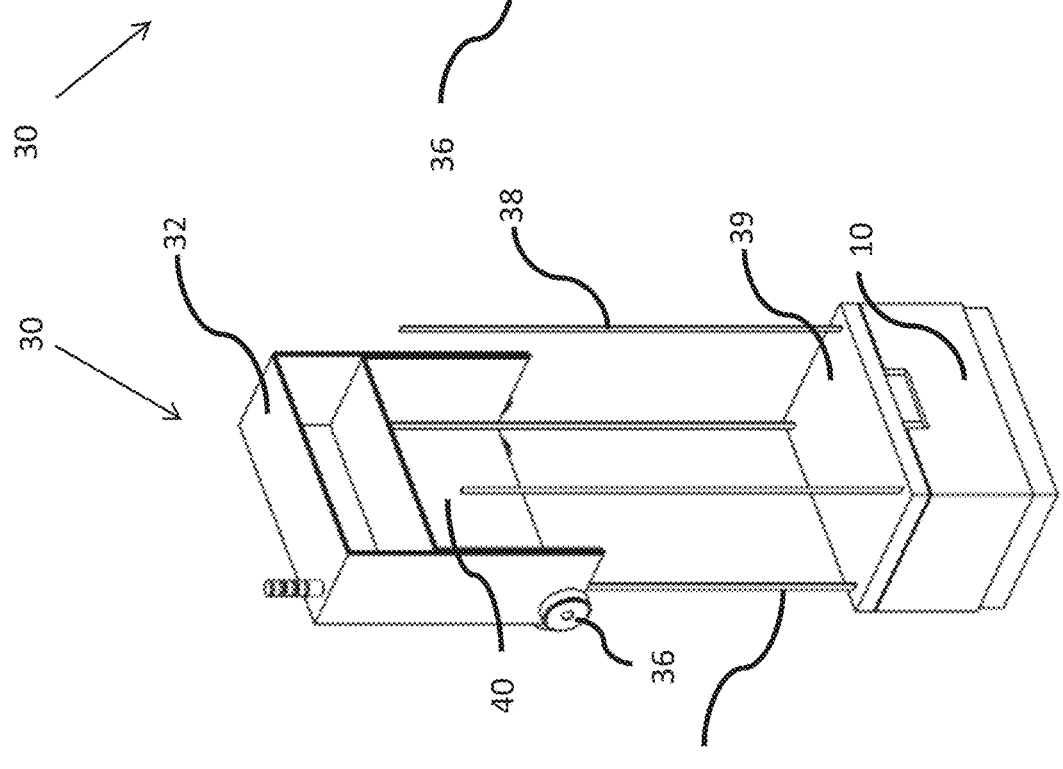
Figure 12A:
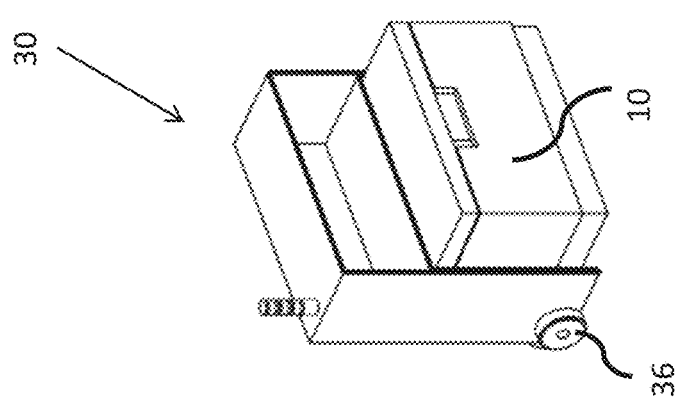
Figure 13:
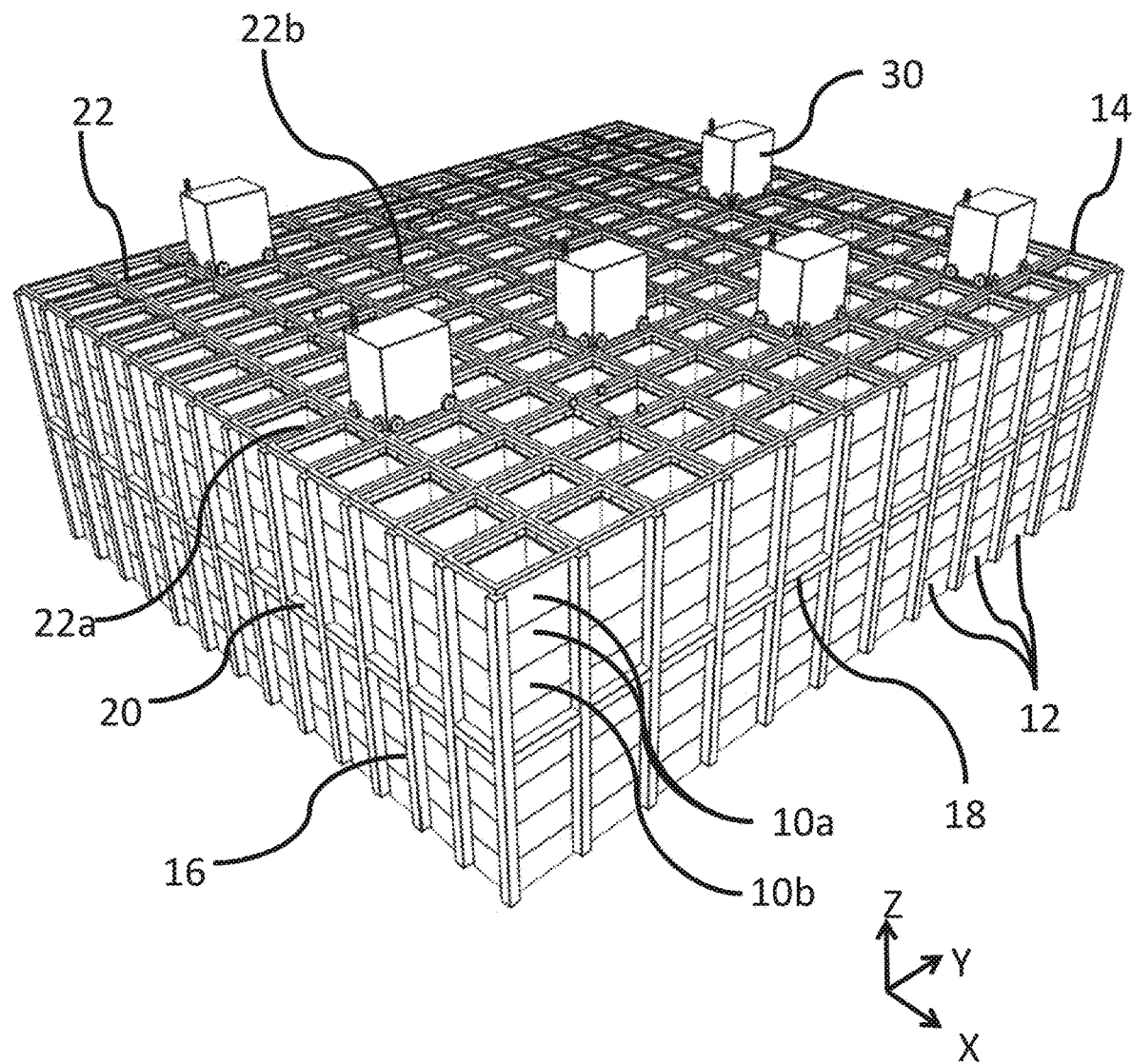
FIG. 13 is a schematic diagram of a system showing load handling devices operating on the framework structure.

The top level of the frame structure 14 includes rails 22 arranged in a grid pattern across the top of the stacks 12. Referring additionally to FIGS. 12 and 13, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

One form of load handling device 30 is further described in Norwegian patent number 317366, the contents of which are incorporated herein by reference. FIGS. 12(*a*) and 12(*b*) are schematic cross sectionals views of a load handling device 30 depositing a bin 10, and FIG. 12(*c*) is a schematic front perspective view of a load handling device 30 lifting a bin 10. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 10. For example, the gripper plate 39 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 39, which is powered and controlled by signals carried through the cables 38 themselves or through a separate control cable (not shown).

To remove a bin 10 from the top of a stack 12, the load handling device 30 is moved as necessary in the X and Y directions so that the gripper plate 39 is positioned above the stack 12. The gripper plate 39 is then lowered vertically in the Z direction to engage with the bin 10 on the top of the stack 12, as shown in FIG. 3(c). The gripper plate 39 grips the bin 10, and is then pulled upwards on the cables 38, with the bin 10 attached. At the top of its vertical travel, the bin 10 is accommodated within the vehicle body 32 and is held above the level of the rails 22. In this way, the load handling device 30 can be moved to a different position in the X-Y plane, carrying the bin 10 along with it, to transport the bin 10 to another location. The cables 38 are long enough to allow the load handling device 30 to retrieve and place bins from any level of a stack 12, including the floor level. The weight of the vehicle 32 may be comprised in part of batteries that are used to power the drive mechanism for the wheels 34, 36.

As shown in FIG. 13, a plurality of identical load handling devices 30 are provided, so that each load handling device 30 can operate simultaneously to increase the throughput of the system. The system illustrated in FIG. 13 may include specific locations, known as ports, at which bins 10 can be transferred into or out of the system. An additional conveyor system (not shown) is associated with each port, so that bins 10 transported to a port by a load handling device 30 can be transferred to another location by the conveyor system, for example to a picking station (not shown). Similarly, bins 10 can be moved by the conveyor system to a port from an external location, for example to a bin-filling station (not shown), and transported to a stack 12 by the load handling devices 30 to replenish the stock in the system.

The picking station is envisaged as a workstation at which items are removed from one container and arranged to be placed into other containers for transport to the customer or bags for transport to the customer. Therefore, there is a need to ensure that items removed from containers are accurately identified so that the customer only receives the items orders. A container may be identified by way of, for example, a barcode, when it enters the picking station. Therefore the load handling system may identify the expected contents of the container at entry into the picking station.

The picking station may comprise a robot system 200 and a control unit 100 according to the first embodiment of the present invention. In this way, picking of items may be sped up as compared to traditional methods because the use of an imaging unit 500 is substantially reduced. Instead the act of moving a picked item from a first container to a second container/bag is enough to verify that the item picked matches one expected to be in the container. Therefore, the time for picking is reduced.

Each load handling device 30 can lift and move one bin 10 at a time. If it is necessary to retrieve a bin 10b ("target bin") that is not located on the top of a stack 12, then the overlying bins 10a ("non-target bins") must first be moved to allow access to the target bin 10b. This is achieved in an operation referred to hereafter as "digging".

Referring to FIG. 13, during a digging operation, one of the load handling devices 30 sequentially lifts each non-target bin 10a from the stack 12 containing the target bin 10b and places it in a vacant position within another stack 12. The target bin 10b can then be accessed by the load handling device 30 and moved to a port for further transportation.

Each of the load handling devices 30 is under the control of a central computer. Each individual bin 10 in the system is tracked, so that the appropriate bins 10 can be retrieved, transported and replaced as necessary. For example, during a digging operation, the locations of each of the non-target bins 10a is logged, so that the non-target bins 10a can be tracked.

The system described with reference to FIGS. 10 to 13 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

However, there are some drawbacks with such a system, which all result from the above-described digging operation that must be performed when a target bin 10b is not at the top of a stack 12.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A storage system comprising:
   a first set of parallel rails or tracks extending in an X-direction, and a second set of parallel rails or tracks extending in a Y-direction transverse to the first set in a substantially horizontal plane to form a grid pattern comprising a plurality of grid spaces;
   a plurality of stacks of containers located beneath the rails, and arranged such that each stack is located within a footprint of a single grid space;
   at least one transporting device, the at least one transporting device being arranged to selectively move laterally in the X and Y directions above the stacks on the rails, and arranged to transport a container;
a picking station arranged to receive the container transported by the at least one transporting device; and
a control unit for operation with a robot system comprising a sensor unit, the robot system arranged to grasp an item from a first container, and the control unit comprising:
a verification unit arranged to:
receive identifying information of an item expected to be in the first container;
receive information from the sensor unit indicative of a dynamics property induced by motion of the grasped item relative to the sensor unit; and
verify whether the grasped item matches the item expected to be in the first container based on the received identifying information and dynamics property information; and
a command unit arranged to, in response to the verification unit failing to verify the grasped item, command the robot system to perform a predetermined maneuver for the verification unit to verify the grasped item based on further dynamics property information corresponding to the predetermined maneuver.

2. The storage system according to claim 1, wherein the further dynamics property information corresponding to the predetermined maneuver is trained in a statistical model.

3. The storage system according to claim 1, wherein the information indicative of the dynamics property of the item comprises at least one of: force information, torque information, shear-force information, acceleration information, sound information, pressure information, an inertial property of the item, and a damping property of the item.

4. The storage system according to claim 1, wherein the at least one transporting device has a footprint that occupies only a single grid space in the storage system, such that a transporting device occupying one grid space does not obstruct a transporting device occupying or traversing the adjacent grid spaces in the X and Y directions.

5. The storage system according to claim 1, comprising the robot system arranged to grasp the item.

6. The storage system according to claim 5, wherein the sensor unit comprises at least one of: a force sensor, a torque sensor, a shear-force sensor, an acceleration sensor, a microphone, or a pressure sensor.

7. The storage system according to claim 1, further comprising an imaging unit arranged to capture identifying information of the item.

8. The storage system according to claim 7, wherein the sensor unit comprises at least one of: a force sensor, a torque sensor, a shear-force sensor, an acceleration sensor, a microphone, or a pressure sensor.

9. The storage system according to claim 1, wherein:
the predetermined maneuver is a second predetermined maneuver of the robot system; and
the command unit is arranged to command the robot system to perform a first, different, predetermined maneuver for the verification unit to verify whether the grasped item matches the item expected to be in the first container based on the dynamics property information corresponding to the first predetermined maneuver.

10. The storage system according to claim 9, wherein the first predetermined maneuver comprises multiple accelerations and decelerations along different axes.

11. The storage system according to claim 9, wherein the second predetermined maneuver comprises more movements than the first predetermined maneuver.

12. The storage system according to claim 1, wherein the verification unit is arranged to verify the grasped item before the item is placed in a second container by the robot system.

13. The storage system according to claim 12, wherein the at least one transporting device has a footprint that occupies only a single grid space in the storage system, such that a transporting device occupying one grid space does not obstruct a transporting device occupying or traversing the adjacent grid spaces in the X and Y directions.

14. The storage system according to claim 12, wherein the further dynamics property information corresponding to the predetermined maneuver is trained in a statistical model.

15. The storage system according to claim 14, wherein the first predetermined maneuver comprises an arcing motion of an end effector of the robot system from the first container to the second container.

16. The storage system according to claim 15, wherein the arcing motion comprises an upward motion, lateral translation, and downward motion of the end effector.

17. A method of operating a robot system comprising a sensor unit in a storage system comprising:
a first set of parallel rails or tracks extending in an X-direction, and a second set of parallel rails or tracks extending in a Y-direction transverse to the first set in a substantially horizontal plane to form a grid pattern comprising a plurality of grid spaces;
a plurality of stacks of containers located beneath the rails, and arranged such that each stack is located within a footprint of a single grid space;
at least one transporting device, the at least one transporting device being arranged to selectively move laterally in the X and Y directions above the stacks on the rails, and arranged to transport a container;
a picking station arranged to receive the container transported by the at least one transporting device;
wherein the robot system is arranged to grasp an item from a first container,
the method comprising:
receiving identifying information of an item expected to be in the first container;
receiving information from the sensor unit indicative of a dynamics property induced by motion of the item grasped by the robot system; and
verifying whether the grasped item matches the item expected to be in the first container based on the received identifying information and dynamics property information; and
commanding the robot system, in response to failing to verify the grasped item, to perform a predetermined maneuver for verifying the grasped item based on further dynamics property information corresponding to the predetermined maneuver.

18. The method according to claim 17, wherein the predetermined maneuver is a second predetermined maneuver of the robot system, the method comprising:
commanding the robot system to perform a first, different, predetermined maneuver for verifying whether the grasped item matches the item expected to be in the first container based on the dynamics property information corresponding to the first predetermined maneuver.

19. The method according to claim 17, comprising verifying the grasped item before placing the item in a second container.

20. The method according to claim 19, wherein the predetermined maneuver is a second predetermined maneuver of the robot system, the method comprising:

commanding the robot system to perform a first, different, predetermined maneuver for verifying whether the grasped item matches the item expected to be in the first container based on the dynamics property information corresponding to the first predetermined maneuver.

* * * * *